United States Patent [19]

Sugimoto et al.

[11] E Patent Number: Re. 33,426

[45] Reissued Date of Patent: Nov. 6, 1990

[54] MULTI-NETWORK SYSTEM

[75] Inventors: Norihiko Sugimoto, Katsuta; Shunji Inada, Hitachi; Nagatoshi Usami, Kanagawa, all of Japan

[73] Assignee: Hitachi, Ltd., Tokyo, Japan

[21] Appl. No.: 379,643

[22] Filed: Jul. 13, 1989

Related U.S. Patent Documents

Reissue of:

[64] Patent No.: 4,680,756
Issued: Jul. 14, 1987
Appl. No.: 839,509
Filed: Mar. 14, 1986

[30] Foreign Application Priority Data

Mar. 18, 1985 [JP] Japan ..... 60-52379

[51] Int. Cl.[5] ..... H04J 3/02

[52] U.S. Cl. ..... 370/85.14; 370/85.13

[58] Field of Search ..... 370/85.1, 85.9, 85.12, 370/85.13, 85.14, 85.15, 94.1, 94.3

[56] References Cited

U.S. PATENT DOCUMENTS

Re. 28,811 5/1976 Pierce ..... 370/85.14
3,890,471 6/1975 Hachenburg ..... 370/88
4,597,078 6/1986 Kempf ..... 370/85.13
4,621,362 11/1986 Sy ..... 370/88
4,627,052 12/1986 Hoare et al. ..... 370/85

*Primary Examiner*—Douglas W. Olms
*Assistant Examiner*—Wellington Chin
*Attorney, Agent, or Firm*—Antonelli, Terry, Stout & Kraus

[57] ABSTRACT

Multi-network system for transmitting data among a plurality of stations, each of which is connected to one of transmission lines, a plurality of said transmission lines being connected with each other through bridge stations, in which the numbers of the transmission lines, with which in final destination station and the source station are connected respectively, are set as the destination address and the source address in the data frame to be sent; in the case where the bridge station receives a frame of data to be relayed between different transmission lines, the bridge station identifies the relay by the destination address, stores the data frame in a memory means storing data, which should be sent by the bridge station itself; attaches to the data to be relayed a flag, in which the relay indication is set, and to the data not to be relayed a flag, in which the relay indication is not set; and when the data are sent by said station, in the case where the flag attached to the data represents the relay, the data frame which has been received is sent without any change.

5 Claims, 8 Drawing Sheets

| DEL | DA | SA | I | FCS | DEL |
|---|---|---|---|---|---|

| NTN | STN |
|---|---|

MULTI-NETWORK SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a multi-network system, by which a plurality of stations communicate data to each other through a plurality of transmission lines and in particular to a multi-network system suitable to transmission from a bridge station connecting two different transmission lines.

2. Description of Related Art

Recently needs to transmit data among a plurality of terminals in the precincts or between two terminals which are in different precincts.

Now the number of terminals connected to one network system increases and if all the terminals were connected through one transmission line, transmission throughput would decrease. In order to prevent the decrease of the transmission throughput, it is necessary to construct a multi-network system, by which terminals are divided into plural groups and made belong to a plurality of transmission lines, which are in turn connected to each other.

In a multi-network system two different transmission lines are connected by a bridge station. The bridge station receives from a transmission line a data frame destined for the other and sends it to an adjacent transmission line. In this case, when the transmission speed, the frame type or the transmission access method is different for different transmission lines, the bridge station sends the data after having effected a transformation treatment for the transmission speed, the frame type, etc. by means of a buffer register incorporated in the bridge station.

As a prior art multi-network system a method is proposed, by which each of the ordinary stations, which are not bridge station, stores the address of the bridge stations connected to the same transmission line, each of the bridge stations storing the address of all the stations connected to two transmission lines, with which it is connected; in the case where a certain station sends data to another station connected to a transmission line other than the transmission line, with which the former is connected, in the data frame the destination address, which is the address of the station receiving the data, is the address of the bridge station and the source address is the address of the former station itself; the address of the station, which should receive finally the data, is included in the information portion in the data frame and send together; and the bridge station interpretes the information portion of the received data frame, recognizes that it is a transmission destined for another transmission line, changes the destination address to the address of the station, which should receive finally the data or in the case where the data should be transmitted further through another bridge station, to the address of the bridge station, and sends the data frame, keeping the source address, which is the original source address, or changing it to the own address of the bridge station. According to this method, in the case where data are transmitted between two stations connected to different transmission lines, there are problems that each of the bridge stations on the data transmission course must read transmitted information, interprete the final destination station and modify the destination address and the source address, that treatment time for this interpretation and address transformation, and that as the consequence the transmission throughput cannot be increased. Furthermore there are problems that each of the ordinary stations must store the address of the bridge stations so that it can have the address of a bridge station in the case of the relay between different transmission lines and that each of the bridge stations must store the address of the all the stations connected to the transmission lines to which the bridge station itself is connected in order that is can be judged whether the destination station is connected with the transmission line to which the bridge station is connected or not.

As another prior art multi-network system, in Japanese Patent unexamined publication No. 84-62245, has been proposed a method, by which the address code of the transmission line, to which the station which should receive the data belongs, is contained in the transmission data frame; in the case where the data transmission is effected in a same transmission line, the address code of the transmission line is set to a predetermined value; and in the case where the data transmission is effected between two different transmission lines, the bridge station receives only data frames, whose address code of transmission line has no specified value and sends the data to the other adjacent transmission line, while changing the address code to a predetermined value. However, also according to this method, there are problems, in the same way as described above, that the bridge station must rewrite the transmission line address relating to the destination station and further that the bridge station must store the address of all the stations connected to the transmission line, to which the bridge station itself belongs.

SUMMARY OF THE INVENTION

An object of this invention is to provide a multi-network system, in which the destination address and the source address in the data frame need not be modified in the bridge station and transmission throughput is increased.

Another object of this invention is to provide a multi-network system, in which every station can transmit data without memorizing the address of the bridge station connected to the transmission line, to which it is connected.

In a multi-network system according to this invention, at the moment of transmission, the number of the transmission line, to which the final destination station is connected, the address of the destination station, the number of the transmission line, to which the source station is connected, and the address of the source station are set at the destination address and the source address in the data frame. A bridge station receives the data frame and judges whether the transmission line of the destination station in the destination address is identical to the number of the transmission line having received the data frame. When the numbers of transmission line are different, the bridge station recognizes that the data are to be sent to a station connected to another transmission line, stores them in a memory device which is used for storing also data sent originally by the bridge station itself, and attaches to the data a flag representing that the data relates to a relay between different transmission lines is set in the relay indication. When data, whose source station is a bridge station itself, are stored in the memory device, the bridge station attaches to the data a flag setting the relay indication. When the bridge station sends the data, it reads out the data to be sent and the flag attached to them from the memory device. If the relay indication is set in the flag, it is judged that they relate to a relay and the data frame, which has been received, are sent without changing the destination address and the source address. If the relay indication is not set in the flag, it is recognized that the data frame is sent originally by the bridge station itself and the bridge station sends the data frame, in which the destination address is the address of the destination station and the source address is the own address of the bridge station.

According to this invention, the treatment operation for changing the destination address and the source address, when the data frame is relayed in the bridge station, becomes unnecessary and the transmission throughput can be increased remarkably.

Further, according to this invention, since it is not necessary that the ordinary stations memorize the address of the bridge stations and each of the bridge stations memorizes the address of all the stations connected to the transmission line, to which the bridge station itself is connected, and it is sufficient for each of the stations to store the number of the transmission line, to which the station itself is connected, and the own address of the station, the memory area can be reduced.

BRIEF DESCRIPTION OF THE DRAWINGS

These and other objects and advantages of the present invention will become apparent be reference to the following description and drawings, wherein.

DESCRIPTION OF THE PREFERRED EMBODIMENT

Figures 1, 2, 3:
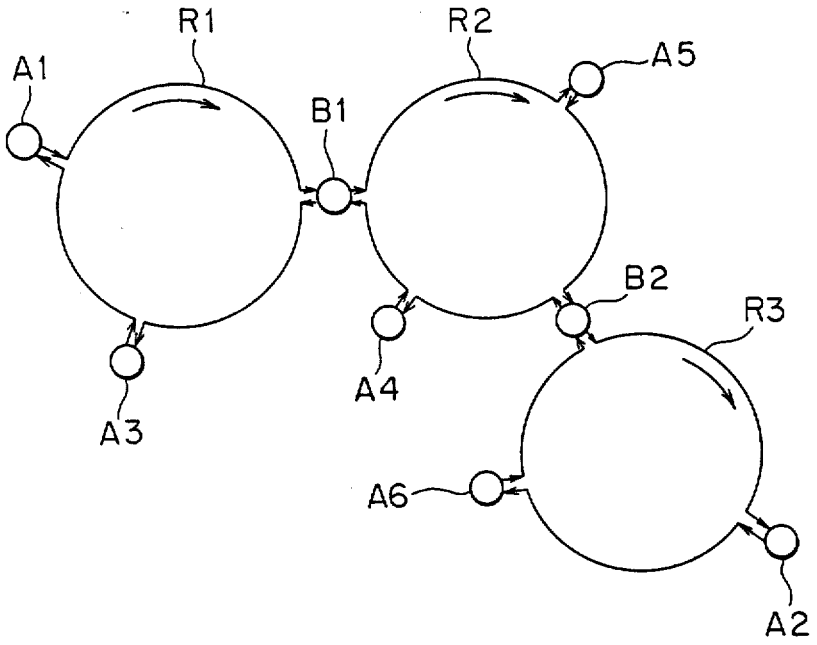
FIG. 1 is a scheme for explanation showing an example of multi-network systems.
FIG. 2 is a scheme indicating an example of data frames.
FIG. 3 is a scheme showing an example of the construction of the destination address and the source address indicated in FIG. 7.

FIG. 1 shows an example of the construction of a multi-network system. In FIG. 1 three ring-shaped transmission lines R1, R2 and R3 are connected through bridge stations B1 and B2. Stations A1 and A3, to which terminals (not shown in the figure) are connected, are connected to the transmission line R1; stations A4 and A5 to the transmission line R2; and stations A2 and A6 to the transmission line R3.

Before explanation of embodiment of this invention, the prior art data transmission method will be explained, referring to FIG. 1.

By the prior art techniques is proposed a method, by which every station stores the address of the bridge station connected to the same transmission line; every bridge station stores the address of all the stations connected to adjacent transmission lines R1–R3, and the destination address DA of a transmission is changed for every transmission line. Here a case, where data are transmitted from the station A1 connected to the transmission line R1 through the transmission line R2 to the station A2 connected to the transmission line R3, will be explained. In this case the destination address and the source address of the station A1 and the bridge stations B1 and B2 are as follows.

| Name of source station | Destination Address | Source Address |
|---|---|---|
| Station A1 | B1 | A1 |
| Bridge Station B1 | B2 | A1 or B1 |
| Bridge Station B2 | A2 | A1 or B2 |

There are known two methods, by one of which the source address is the address of an original source station A1 and by another of which it is the address of a bridge station B1 or B2 at the moment of each transmission. By the latter method the address of the original source station A1 is memorized in an information part of the data to be transmitted. Further the address of the final destination address A2 is memorized in an information part of the data sent by the stations A1 and B1. By this method the address of the destination station and/or the address of the source station must be changed at every bridge station. Further all the ordinary stations should memorize the address of the bridge stations and the bridge stations should memorize the address of all the stations connected to the transmission line to which they are connected.

This invention has been done in order to resolve such problems in the prior art techniques. FIG. 2 shows an example of data frame type according to this invention. One data frame consists of 2 delimiters DEL indicating the frame boundaries, a destination address DA indicating the station which receives data, a source address SA indicating the station which has sent the data, information I which is to be sent, and an [error check pattern] *frame check sequence* FCS. In this case, as indicated in FIG. 3, each of the destination address DA and the source address SA consists of the number of transmission line NTN (R1, R2, etc.) indicating each of transmission line in order to identify one of a plurality of transmission lines and the station address STN (A1, A2, etc.) allocated to each of the stations.

In the case where data is transmitted from the station A1 through the transmission lines R1, R2 and R3 to the station [A1] *A2* the destination address DA of a data frame transmission line R3 and a station address A2, and the source address SA consists of a number of transmission line R1 and a station address A1. The bridge station B1 judges whether the number of transmission line in DA of the data frame received through the transmission line R1 is equal to R1 or not. In the case of this example representing the data frame coming from the station A1, since they are not identical, the bridge station recognizes that it is relayed between transmission lines and stores the received data frame together with the destination address DA and the source address SA in its memory device. In connection with these stored data it sets "1" for the relay indication flag RF. Data sent originally by the bridge station B1 are also stored in this memory device. In this case it sets "0" for the relevant flag RF. In the case where data are transmitted by the bridge station B1 to the transmission line R2 data to be sent are read out from this memory device and at this moment it is judged whether the relevant flag is "1" or "0". In the case where RF is "1", it is recognized that it is a relay between transmission lines and in the case of this example the received data from the station A1 are further sent to the transmission line R2 without changing the received data frame. In the case where RF is "0", a data frame, in which the address of a predetermined destination station is set for DA and the a number of transmission line R2 and the address of the station B1 are set for SA, is sent.

The bridge station B2 effects also operations identical to those carried out at the station B1. The bridge station B2 judges whether the number of transmission line in DA of the data frame received through the transmission line R1 is equal to R2 or not. In the case of this example representing the data frame relayed by the bridge station B1, since they are not identical, the bridge station recognizes that it is relayed between transmission lines. Then it sets the received data frame in its memory device and "1" for the relevant flag RF. In the case where data are sent to the transmission line R3, when the data of this example stored in the memory device are read out, by identifying that the relevant flag RF is "1", it is recognized that it is relayed between transmission lines and the received data are further sent to the transmission line R3 without changing the received data frame. When the station A2 receives this data frame, it recognizes that its DA specifies the station itself and receives the data. Each of the stations must memorize the number of the transmission line, to which it is connected and its own address, in order to set the number of transmission line and its own address for SA of the data frame for which the station itself is the source station, to confirm, when the transmission line is ring-shaped, that when the station receives data, they are destined for the own station, to confirm that data sent by the station itself has made a round of the ring, but it is not necessary to memorize the address of the stations other than the stations mentioned above.

As indicated above, according to this invention, it is not necessary to change the destination address DA and the source address SA at each bridge station. Further it is also not necessary that each of the ordinary stations memorizes the address of the bridge stations and that each of the bridge stations memorizes the address of the stations connected to the transmission line, with which it is connected, and thus the problem in the prior art techniques described above can be resolved.

Next the construction and operation of each of the devices in a multi-network system according to this invention will be explained below.

Figure 4:
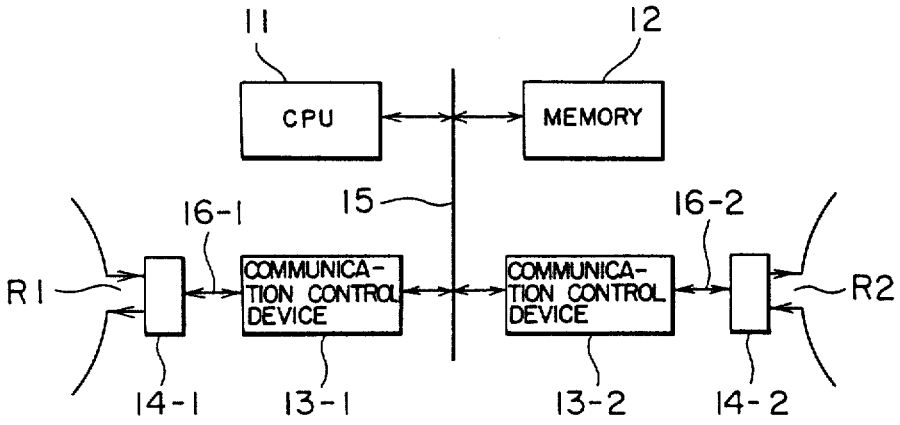
FIG. 4 is a block diagram indicating the construction of a bridge station in an embodiment of the multi-network system according to this invention.

FIG. 4 is a scheme indicating a bridge station according to an embodiment of this invention. As indicated in the figure, it consists of a CPU 11 controlling sending parameters, sent data and receiving buffers, a memory device 12 storing sending parameters, sent data, received data, etc., driver-receivers 14-1, 14-2 sending-/receiving serial signals to/from transmission lines R1, R2, to which the bridge station is connected, a data bus 15, and communication control devices 13-1, 13-2 controlling sending and reception. Further, although this embodiment will be explained for the case of ring-shaped transmission lines, as indicated in FIG. 1, it is of course that the same effect can be obtained by using bus-shaped transmission lines.

The CPU 11, the memory device 12 and the communication control devices 13-1, 13-2 are connected with each other through the data bus 15. Further the communication control devices 13-1 and 13-2 are connected with each other through the driver-receivers 14-1, 14-2 and serial signal lines 16-1, 16-2. In addition, in the case where the bridge station has a terminal function, the terminal function portion (not shown in the figure) can be connected either through the data bus 15 on through the memory device 12.

On the other hand, each of the stations other than the bridge stations (e.g. A1–A6 in FIG. 1) is connected to one set of transmission lines, and the system is realized by the construction that, except for the communication control device 13-2, the serial signal line 16-2 and the driver-receiver 14-2, terminal function portions (not shown in the figure) are connected through the data bus 15 or the memory device 12.

The memory device 12 of the stations other than the bridge stations stores the sending parameters, which are necessary for sending, i.e. the frame length and the destination address DA. The memory device 12 of the bridge stations stores, apart from the frame length and the destination address DA, a plurality of flags RF representing the relay between transmission lines, which are used for identifying whether the data frame is received from the first transmission line and to be sent to the second transmission line on the source station is a bridge station, source address SA in the case of the relay frame, information to be sent I, sending statuses representing the results of sending, reception parameters comprising the destination address DA of the received frame and the source address, received information I, and reception statuses representing the status of reception.

Figure 5:
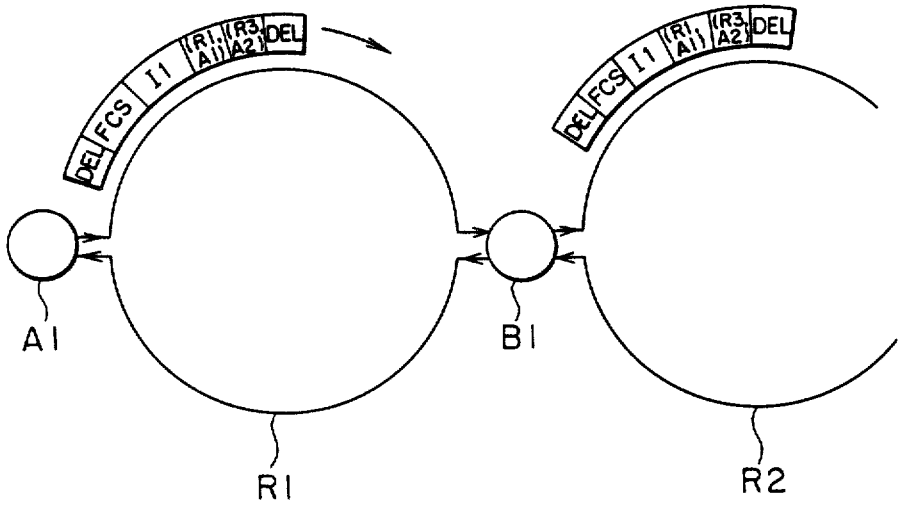
FIG. 5 is a scheme for explanation showing an example of transmission of data frames according to this invention.

Considering now a ring-shaped multi-network system indicated in FIG. 1, a case, where the station A1 sends a data frame to the station A2 connected to another transmission line R3, will be described. As indicated in FIG. 5, when sending is allowed, the station A1 sends a data frame, in which the destination address DA is A2 and the source address SA is A1, to the transmission line R1.

When the data frame reaches the bridge station B1 connected to the transmission line R1, the bridge station B1 examines the destination address DA. When, as the result, it is recognized that it is destined not for the own station, but for a station connected to a transmission line other than the transmission line R1, this data frame is stored in the memory device 12. In this case, it can be judged whether it should be stored in the memory 12 or not, by examining not all the destination addresses DA but only the number of transmission line NTN in DA.

Figure 6:
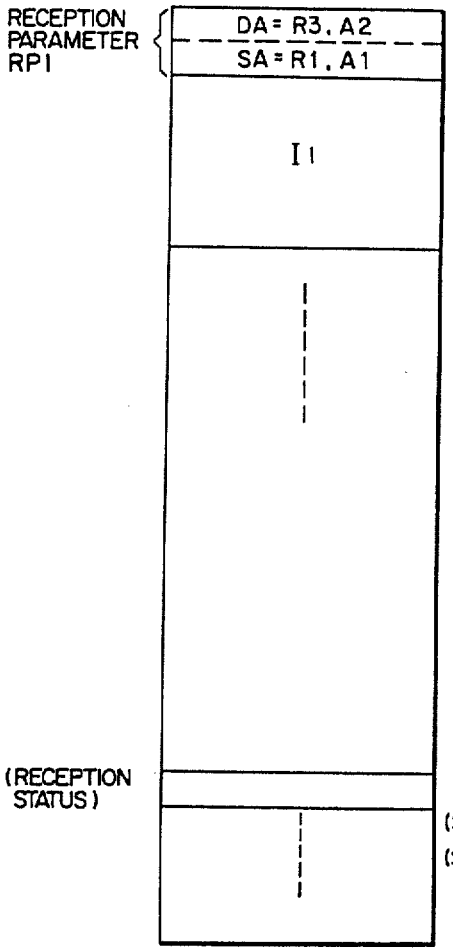
FIG. 6 is a scheme for explanation showing a received data frame stored in the memory indicated in FIG. 2.

Among the data frames received by the bridge station B1, as indicated in FIG. 6, the number of transmission line R3 and the address of the station A2 are stored in the memory device 12 as the destination address DA in the reception parameter RP1.

The transmission course of the received data frame from the transmission line R1 to the memory device 12 passes through the driver-receiver 14-1, the serial signal line 16-1, the communication control device 13-1 and the data bus 15.

Figure 7:
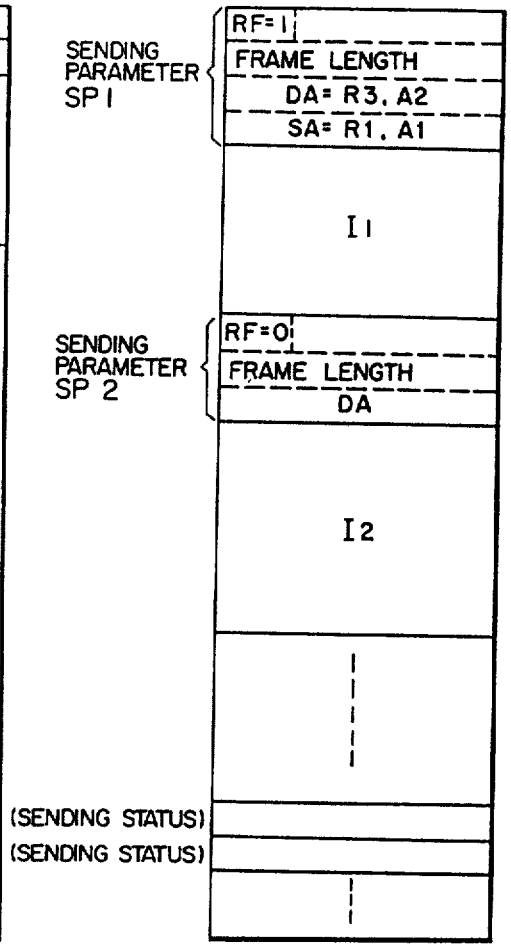
FIG. 7 is a scheme for explanation showing a data frame for transmission stored in the memory indicated in FIG. 2.

Since the received data frame is destined for another transmission line, i.e. a relay frame, it is transformed into a sending parameter SP1 indicated in FIG. 7 and the CPU 11 gives the communication control device 13-2 a command to start sending.

In the case of a relay frame, in the sending parameter SP1, the flag RF indicating that it is a is "1" as indicated in FIG. 7, and further the address of the original source station SA is not changed. Consequently R1 and A1 remain unchanged. Beside them the sending parameter SP1 comprises the frame length and the destination address DA (R3, A2).

The communication control device 13-2 sends, as indicated in FIG. 5, serial signals of the destination address DA=R3, A2 and the source address SA=R1, A1 through the serial signal line 16-2 and the driver-receiver 14-2 to the transmission line R2.

FIG. 7 shows a sending parameter SP2 in the case where the original source station is a bridge station. In the sending parameter SP2 the flag RF is "0" and the sending parameter SP2 includes, apart from the flag RF, the frame length and the destination address. In the case where the original source station is a bridge station, the source address SA is produced in the communication control devices 13-1 and 13-2.

The bridge station B2 connected with the transmission line R2 in FIG. 1 receives the data frame sent by the bridge station B1; effects a treatment similar to that in the station B1; in the case of this embodiment, identifies the relay frame; and sends the data frame to the transmission line R3.

In the same way, in FIG. 1, the other bridge station B2 connected with the transmission line R2 receives the data frame, which the bridge station B1 has sent, as the relay frame and sends it to the transmission line R3.

To the transmission line R3 is connected the station A2, which recognizes that the destination address DA is the data frame destined for the station itself and receives it.

Further, although other bridge stations (not shown in the figure) are connected to the transmission line R3, the other bridge stations recognize that the station address in the destination address DA is not its own address, because the number of transmission line in the destination address DA is R3, which is its own transmission line, and doesn't receive it. That is, the data frame is not transmitted to any other transmission line.

A bridge station is provided with two sets of communication control devices 13 (13-1 or 13-2) and a station, which is no bridge station, is provided with one set.

Figure 8:
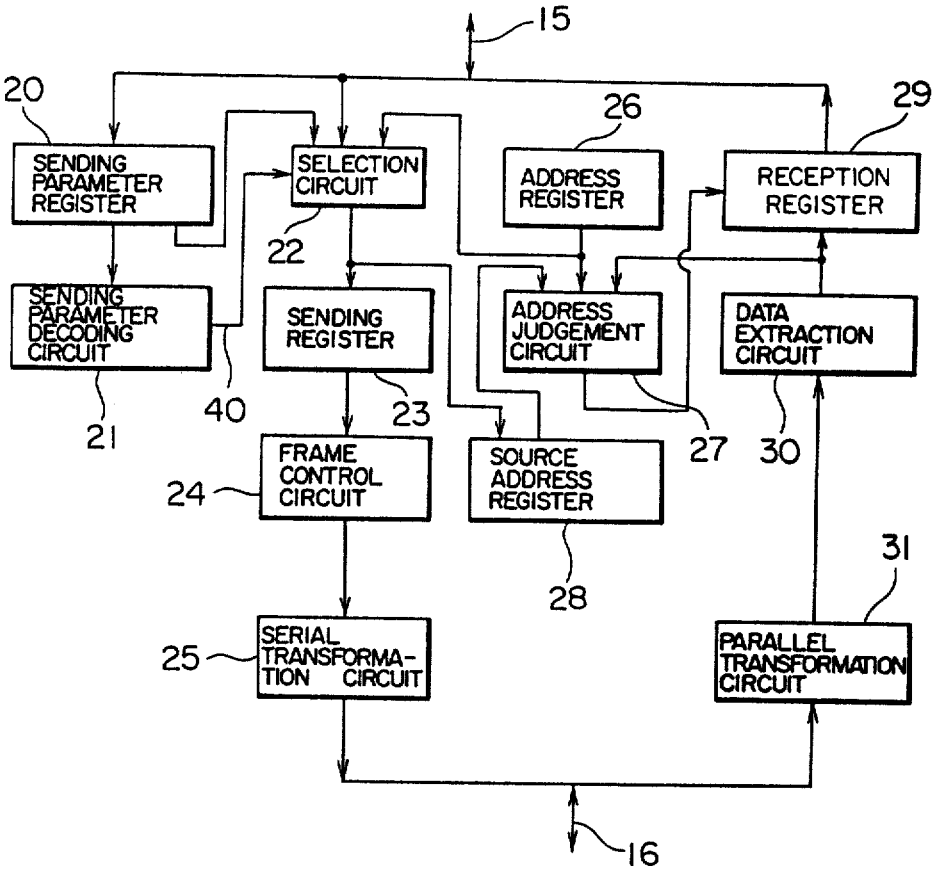
FIG. 8 is a block diagram indicating the construction of a communication control device of a bridge station in an embodiment of the multi-network system according to this invention.

Next the communication control device 13 will be explained in detail, referring to FIG. 8. The communication control device 13 reads out sending parameters from the memory device 12 through the data bus 15 at the moment of a transmission, and stores them to a sending parameter register 20. The transfer of the sending parameters from the memory device 20 to the sending parameter register 20 can be carried out either by the CPU 11 according a predetermined program or by the DMA (Direct Memory Access) transfer. In this embodiment either method can be utilized.

The flag RF contained in the sending parameters stored in the sending parameter registers is used in a sending parameter decoding circuit 21 for the purpose of the judgement whether the data frame is a relay frame or the source address indicates the frame of the own station. In the case where the flag RF is "1" and it is recognized that it is a relay frame, the destination address DA and the source address SA stored in the sending parameter register 20 are selected by a selection circuit 22 and outputted to a serial signal line 16, after having been transformed into a serial transformation circuit 25 through a sending register 23 and a frame control circuit 24. The selection by the selection circuit 22 is effected by a sending data commuting signal 40 outputted by the sending parameter decoding circuit 21. Further, the frame control circuit 24 produces the delimiters DEL showing the boundaries of the frame and the [error check pattern] *frame check sequence* FCS.

Information [II] *I1* etc. following the source address SA is outputted via the data bus 15 and the selection circuit 22 through the sending register 23, the frame control circuit 24 and the serial transformation circuit 25 to the serial signal line 16.

In addition, when the source address SA is stored in the sending register 23, it is stored in a source address register 28 and used for the address check of the received data frame.

On the other hand, in the case where it is recognized that the flag RF is "0"; it is not a relay frame; and the source address indicates the frame of the own station, the destination address DA is read out from the sending parameter register 20 and is stored through the selection circuit 22 in the sending register 23. After that, the selection circuit 22 select the source address SA among various sorts of data outputted by the address register 26 and this source address SA is stored in the sending register 23 and the source address register 28. Further the address register 26 memorizes, apart from the source address SA, the station address of the own station and the number of the transmission line NTN, with which the station itself is connected.

When the data frame is received, the serial signal outputted by the driver-receiver 14 is inputted through the serial signal line 16 in a parallel transformation circuit 31. This parallel signal is inputted in a data extraction circuit 30 and the detection of the delimiters DEL is carried out. By this detection the destination address in the received data frame is inputted in an address judgement circuit 27 and it is judged whether the number of transmission line *NTN* of the own station is in accordance with the content of the address register, in which the station address STN is stored or not. In the case where the communication control device 13 is used in a bridge station, when the number of transmission line NTN is the destination address DA is not in accordance with the received number of transmission line NTN, the content of the received data frame is stored through a reception register 29 and the data bus 15 in the area for the reception in the memory devie 12. The transfer from the reception register 29 to the memory device 12 is carried out, just as the transfer at the moment of the transmission, either according to a program in the CPU 11 or by the DMA transfer.

Further, in the address judgement circuit 27, the content of the source address register 28 is compared with the source address of the received data frame. In the case where the transmission line is ring-shaped, it is confirmed that the sent frame has made a round of the transmission line and returned to the own station.

Figure 9:
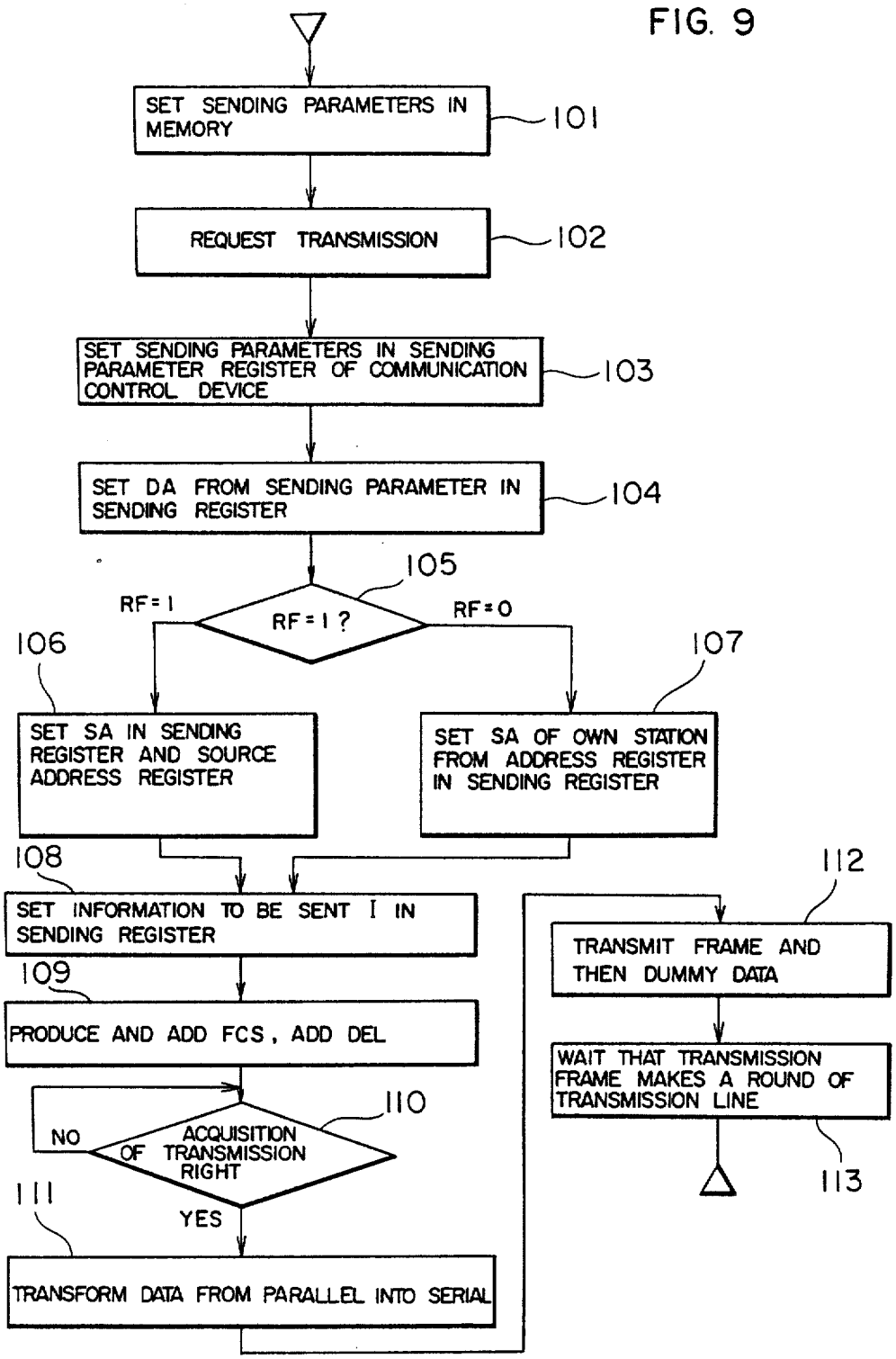
FIG. 9 is a flow chart for explaining the data transmission treatment operation in the bridge station and the ordinary station in an embodiment of the multi-network system according to this invention.
Figure 10:
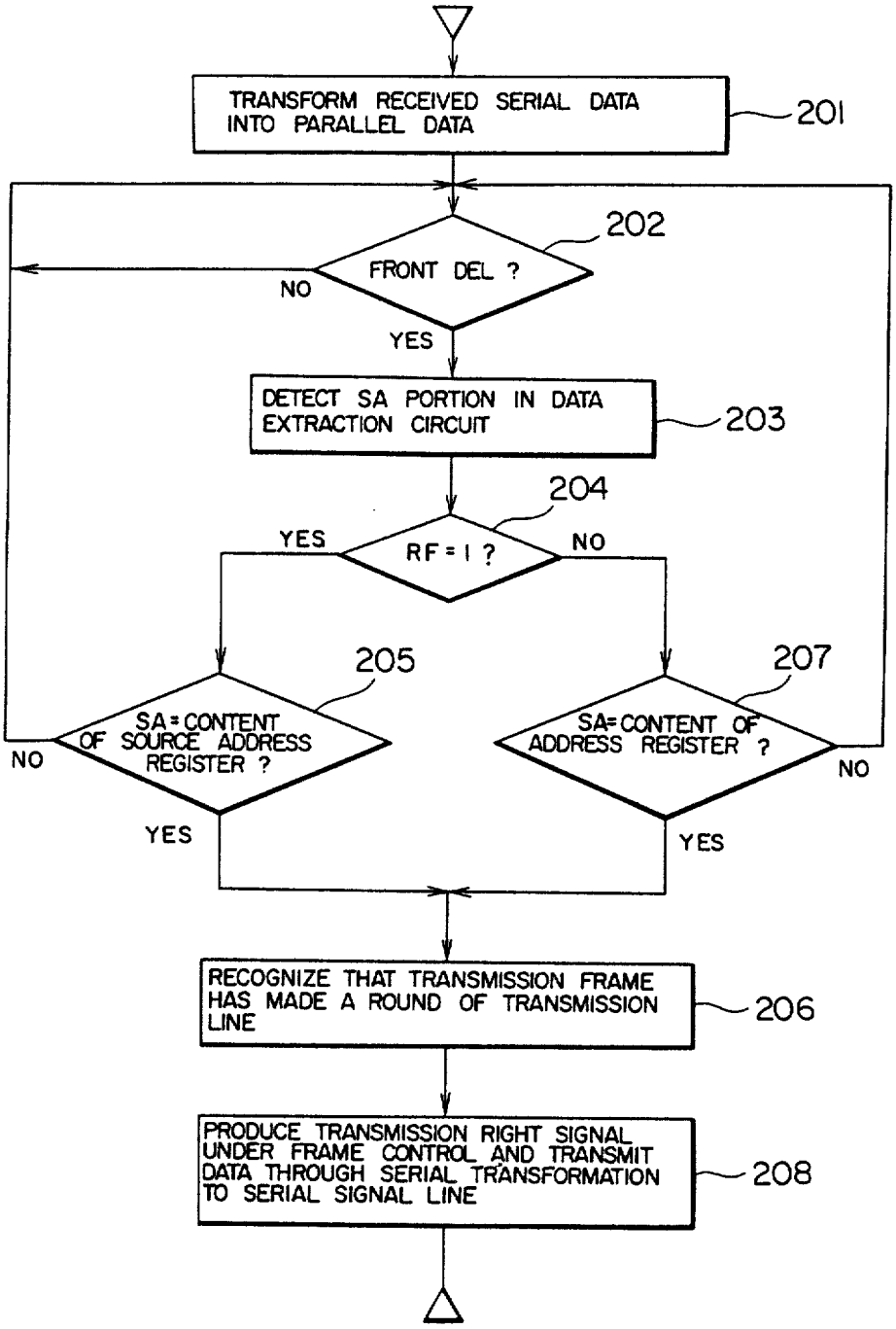
FIG. 10 is a flow chart for explaining the treatment for confirming that the sent frame has made a round of the transmission line after having effected the data transmission treatment operation indicated in FIG. 9 in the bridge station and the ordinary station in the embodiments according to this invention.

FIGS. 9 and 10 represents flow charts for the treatment of the data transmission. Referring to FIG. 9, in the case of the data transmission, the relay flag RF, the frame length, the destination address DA and the source address SA are set from the CPU 11 in the memory 12 (Step 101). The CPU 11 sends a transmission request to the communication control device 13 (Step 102). In response to the transmission request, the communication control device 13 reads out sending parameters from the memory and sets them in the sending parameter register 20 (Step 103). Then the destination address DA is set from the sending parameter register 20 in the sending register 23 (Step 104), and in the sending parameter decoding device 21 it is judged whether the sending parameter RF is "1" or not (Step 105). When RF=1, the source address SA is send from the sending parameter register 20 to the sending register 23 and the source address register 28 (Step 106) and when RF=0, the source address SA is written from the address register 26 in the sending register [28] *23* (Step 107). Then the information to be sent I is set in the sending register 23 (Step 108). Then the [error check pattern] *frame check sequence* FCS is produced and added and the delimiters DEL are added (Step 109). At this moment the relevant bridge station obtains a transmission right (Step 110). The acquisition of the transmission right is necessary in the case where the transmission line is ring-shaped, as indicated in FIG. 1. When the transmission right is obtained, the data to be sent are transformed from parallel data into serial data (Step 111). After that, the data frame and then dummy data are transmitted (Step 112) and the station waits that the transmission frame makes a round of the transmission line (Step 113). The transmission of the dummy data also is necessary in the case where the transmission line is ring-shaped.

FIG. 10 shows a flow chart for the treatment for detecting data, which has made a round of the transmission line, after the transmission of the data. In the communication control device 13 the received serial data inputted from the serial signal line 16 are transformed into parallel data in the parallel transformation circuit 31 (Step 201). Then the front delimiter is detected (Step 202). In the case where it is detected, the source address SA portion is detected in the data extraction circuit 30 (Step 203) and it is judged whether the flag RF set in the sending parameter register 20 is "1" or not (Step 204). When RF=1, it is recognized that a relay frame is being transmitted. Then it is judged whether the source address SA is identical to the content of the source address register 28 or not (Step 205). When they are identical, it is recognized that the transmission frame sent by the own station has made a round of the transmission line (Step 206). When they are not identical, it is recognized that the received frame is not the transmission frame of the own station and the detection of the front delimiter is again effected (Step 202). If not RF=1, it is judged whether the source address is identical to the content of the address register 26 or not (Step 207). When they are identical, it is recognized that the transmission frame has made a round of the transmission line (Step 206) and when they are not identical, the detection of the front delimiter is again effected (Step 201). When it is recognized that the transmission frame has made a round of the transmission line, a transmission right signal is produced under the frame control *circuit 24* and the data are tranmitted through serial transformation *circuit 25* to the serial signal line 16 (Step 208).

Figure 11:
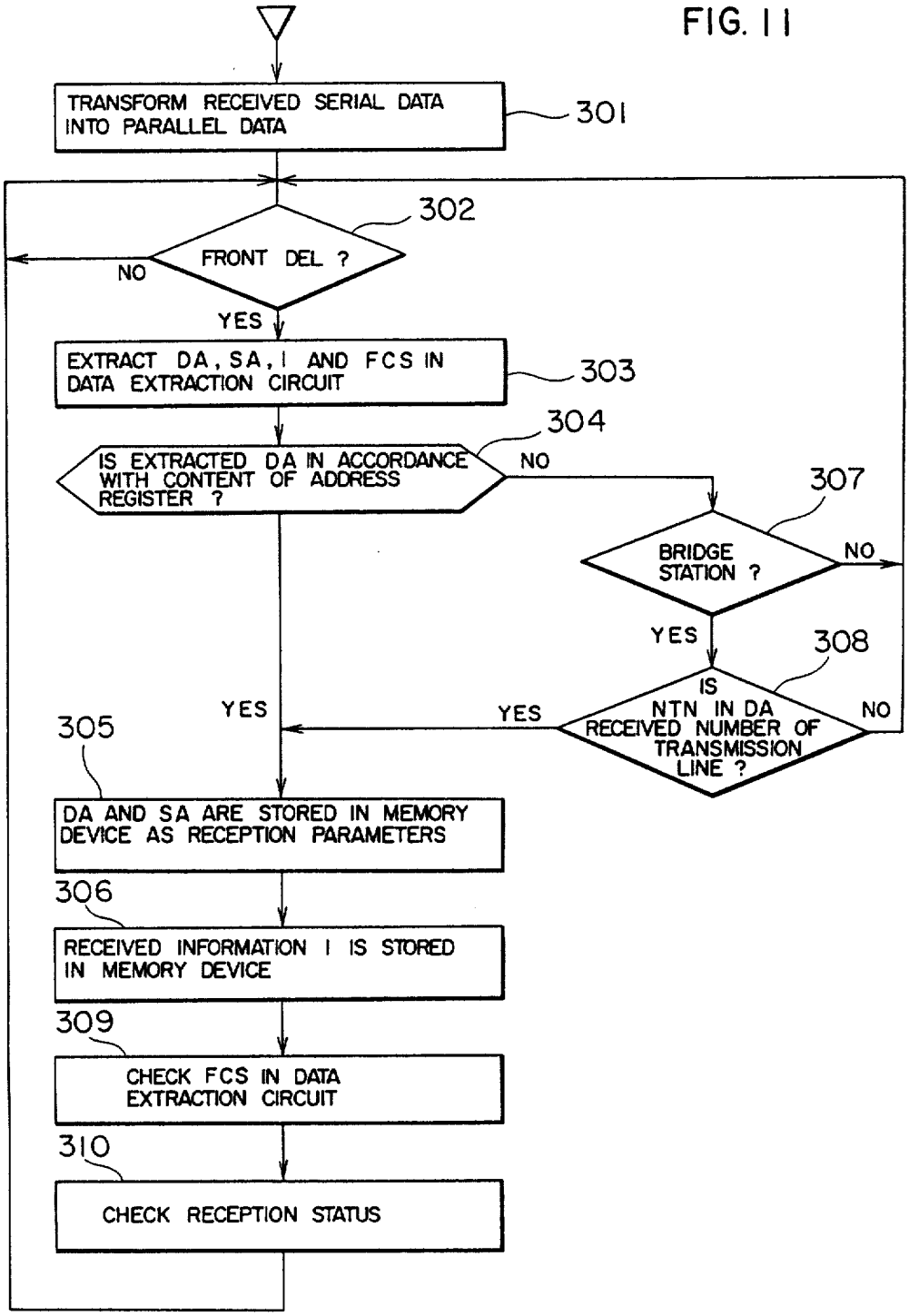
FIG. 11 is a flow chart for explaining the data reception treatment operation in the bridge station and the ordinary station in the embodiments according to this invention.

FIG. 11 represents a flow chart for the treatment of the data reception in the bridge station and the ordinary station. The communication control device 13 transforms the serial signal inputted from the serial signal line 16 into parallel data in the parallel transformation circuit 31 (Step 301) and effects the detection of the front delimiter (Step 302). When the front delimiter is detected, the destination address DA, the source address SA, information I and the [error check pattern] *frame check sequence* FCS are extracted in the data extraction circuit 30 (Step 303). Then it is judged whether the extracted destination address DA is in accordance with the content of the address register 26 or not (Step 304). When they are in accordance with each other, the destination address DA and the source address SA are stored in the memory device (Step 305) and received information I is also stored in the memory device (Step 306). When they are not in accordance in the case where the relevant station is no bridge station, it is recognized that the received data are not destined for the own station and the front address is detected. In the case where it is a bridge station, it is judged whether they are destined for the own station or they belong to a frame to be relayed (Step 307). In the case where it is a bridge station, it is judged whether the number of transmission line NTN in the destination address DA is the received number of transmission line or not (Step 308). When it is the received transmission line, it is recognized that it is not a relay frame, but it is not destined for the own station and the detection of the front delimiter is effected (Step 302). The data received by the station are transmitted also to the following station on the transmission line and consequently at each of the following stations it is judged whether the data, which have been judged at the relevant station not to be destined for itself or not to belong to a relay frame, are destined for the own station or not. In the case where it is a bridge station, when the number of transmission line NTN in the destination address DA is different from the received number of transmission line, the destination address DA and the source address SA are stored as reception parameters in the memory device (Step 305) and the received information I is stored also in the memory device (Step 306). Then the [error check pattern] *frame check sequence* FCS is checked in the data extraction circuit 30 (Step 309) and the reception status is checked (Step 310). The communication control device 13 terminates here the treatment of a reception operation and detects again another front delimiter (Step 302).

Figure 12:
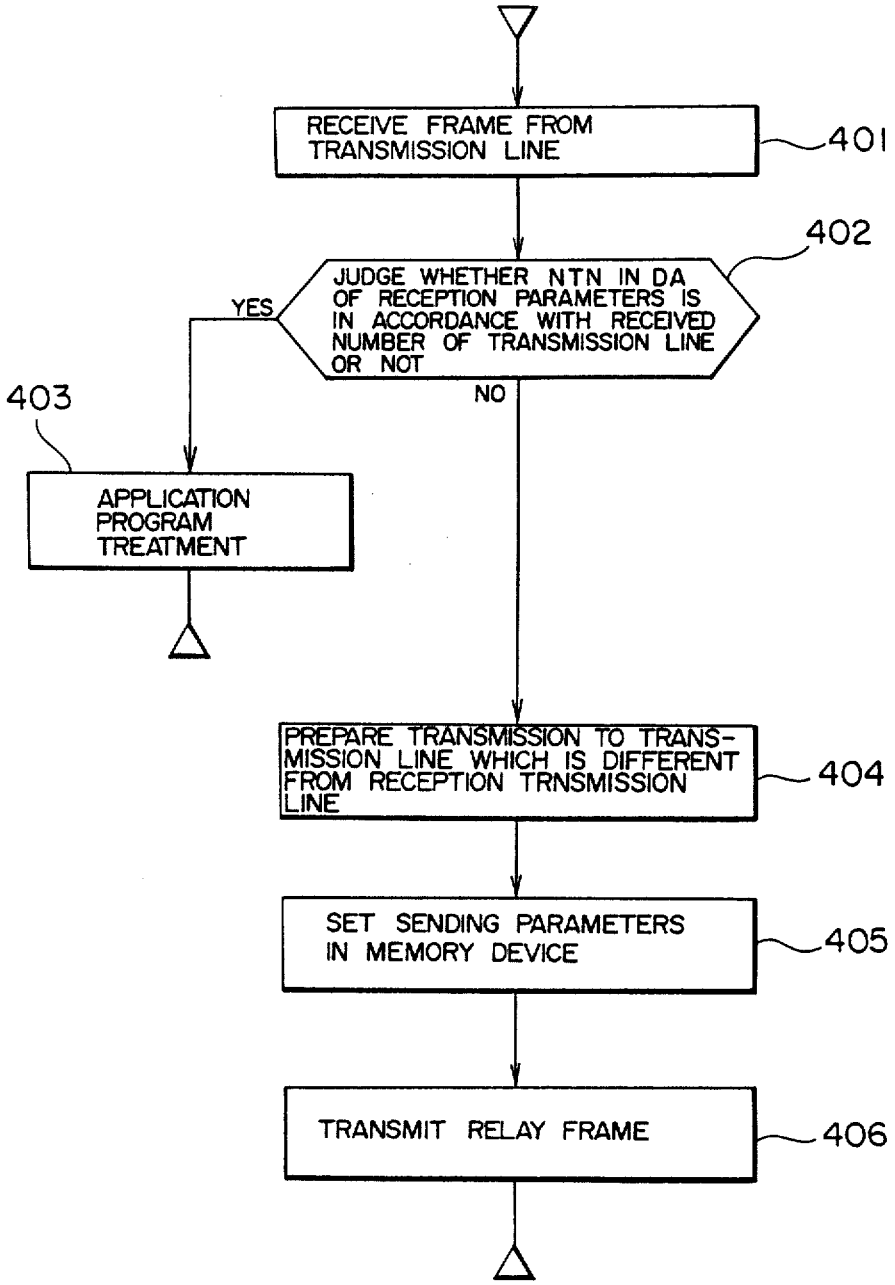
FIG. 12 is a flow chart for explaining the relay treatment operation in the bridge station in the embodiments according to this invention.

FIG. 12 is a flow chart for the treatment in the bridge station from the reception of a relay frame to the transmission of it, after having recognized that it is a frame to be relayed. In the figure a bridge station B1 is supposed. When data are received from the transmission line R1 by the treatment indicated in FIG. 11 (Step 401), the CPU 11 judges whether the number of transmission line NTN in the destination address DA of the reception parameters is in accordance with the received *number of the* transmission line (the number of transmission line R1 for the bridge station B1 in FIG. 1) or not (Step 402). When it is the received number of transmission line, it is recognized that the data are destined for the own station and an application program treatment is effected (Step 403). In the case where it is different from the received number of transmission line, a transmission to a transmission line, which is different from the reception transmission line (the transmission line R1 for the bridge station B1 in FIG. 1), is prepared (Step 404). Then the sending parameters are set in the memory device and "1" is set at the flag RF (Step 405). Finally the treatment for the transmission of the relay frame indicated in FIGS. 9 and 10 are effected (Step 406).

In the case where a frame is transmitted from the station A1 in the multi-network indicated in FIG. 1, when the treatment in FIGS. 9 and 10 is effected, since here RF=0, it is not necessary to store the source address containing the number of transmission line R1 and the station address A1 in the source address register 28.

The bridge station B1 receives the frame with the treatment indicated in FIG. 11. In the case of this embodiment, as indicated in FIG. 12, the CPU 11 judges that it is a relay frame and sends the frame to the transmission line R2 by the treatment indicated in FIGS. 9 and 10 after having set RF=1. In this case, since RF=1, the source address SA to be sent is not R2, B1 in the case of the transmission by the station itself, but R1, A1, and this source address SA is stored in the source *address* register 28.

The bridge station B2 effects a treatment similar to that at the bridge station B1 and sends the frame to the transmission line R3. The station A2 receives it after having treated the frame, which has been transmitted by the bridge station B2, as indicated in FIG. 11. Here, since the station A2 is not a bridge station it receives only frames destined for itself.

Furthermore, the block diagram indicated in FIG. [1] *8* can be applied either to the communication control device of a bridge station or to that of a station other that the bridge stations and the communication control circuit indicated in the block diagram of FIG. [1] *8* can work according to the required functions selected by each of the stations.

While particular embodiments of this invention have been shown and described, it will be obvious to those skilled in the art that various changes and modifications may be made without departing from the present invention in its broader aspect.

We claim:

1. Multi-network system for transmitting data among a plurality of stations, each of which is connected to one of transmission lines, a plurality of said transmission lines being connected with each other through bridge stations, comprising:

a plurality of stations, each of which is connected to one of the transmission lines, sends, receives and relays data consisting of a means for forming the own address of the station including the number of transmission line to which the station is connected, a means for forming the destination address including the number of transmission line, to which the destination station which should receive data sent by the former station is connected, and a means for sending the data having the destination address and the own address of the former station in the form of address information in the transmitted data frame at the moment of sending the data; and at least one bridge station connected with two different transmission lines, which sends, receives and relays data and relays data between the different transmission lines, consisting of a memory means storing data sent by the own station and data to be relayed between the different transmission lines, a means for judging at the moment of the reception of the data whether the number of transmission line contained in the address information of the received data frame is different from the number of transmission line, from which the data have been received, or not and when they are different, storing received data containing the address information in said memory means; a means for setting a flag representing the relay between the transmission lines in connection with the received data stored in said memory means and when data sent by the own station are stored in said memory means, a flag indicating that they are not data relayed between different transmission lines in connection with said data; a means for forming the own address including the number of transmission lines for each of the transmission lines with which the own station is connected; a means for forming the destination address including the number of transmission line, with which the destination station which should receive the data sent by the own station is connected; and a transmission means for judging at the moment of sending data whether the flag in connection with the sent data stored in said memory means represents a relay between the different trasmission lines or not; when the flag represents a relay between the different transmission lines, sending the relevant data in the form of a data frame, which are the received data, including the address information; and when the flag doesn't represent any relay between the different transmission lines, sending the relevant data in the form of a data frame having said destination address and the own address of the station as the address information.

2. Multi-network system according to claim 1, wherein said transmission means comprise a first register, which stores the destination address and the source address contained in the data, when the data to be sent are those to be relayed between different transmission lines, and the destination address, when they are data sent by the own station; a second register for storing the own address of the station; a means for judging whether the flag is connection with the data to be sent represent the relay between different transmission lines or not; and a transmission means, according to the judgment, sending the destination address and the source address stored in said first register, when the flag represents a relay between the different transmission lines, and the destination address stored in said first register and the own address of the station stored in said second register, when the flag doesn't represent any relay between the different transmission lines.

3. Data transmission method in a multi-network system for transmitting data among a plurality of stations, each of which is connected to one of transmission lines, a plurality of said transmission lines being connected with each other through bridge stations, consisting of the following steps:

sending from a station connected to one of said transmission lines a data frame containing the own address of the station including the number of the transmission line, to which the station is connected, and the destination address including the number of the transmission line, to which the destination station which should receive the data sent by the own station is connected, together with data to be sent; and in a bridge station between the transmission line to which the source station is connected and another transmission line which transmits the data coming from said station, comparing the number of the transmission line, to which the destination station is connected, contained in the received data with the number of the transmission line from which the bridge station has received the data; in the case where these numbers are different, storing the received data in a memory means which stores also the data to be sent, when the bridge station sends the data, attaching the flag indicating that they do not belong to any relay between different transmission lines and attaching the flag representing the relay between different transmission lines; in the case where these numbers are identical, relaying the data in the transmission line from which the data have been received; judging whether the flag in connection with the data to be sent, which have been stored at the moment of the data transmission, is the flag representing the relay between different transmission lines or not; when the flag represents the relay between different transmission lines, sending the data frame containing the address of said station and that of the destination station together with the data to be sent, which are the received data, without any change; and when the flag doesn't represent the relay between different transmission lines, sending the data frame containing the address of the bridge station and that of the destination station together with the data to be sent.

*4. A multi-network system for transmission data among a plurality of ordinary stations by sending a data frame including at least a source address and a destination address, each ordinary station being connected to one of a plurality of transmission lines, one of said transmission lines being connected with another transmission line through a bridge station, said data frame being related between transmission lines through a bridge station, wherein; said bridge station is connected to receive said data frame from said one transmission line, and includes memory means storing at least a source address in a received data frame, means for relaying said data frame to said other transmission line, and means for judging whether the source address in a data frame within said other transmission line is identical to a source address stored in said memory means, whereby it is recognized that the relayed data frame has made a round of said other transmission line.*

*5. A multi-network system according to claim 4, wherein said bridge station further has judge means for judging whether said data frame received from said one transmission line is a data frame which is to be transmitted to said other transmission line, and means responsive to judgement by said judge means that said data frame is a data frame to be transmitted to said other transmission line for setting a flage indicating the relay of a data frame between the transmission lines and transmitting said data frame to the other transmission line without changing said source address and said destination address.*

* * * * *